United States Patent [19]

Allport

[11] 3,767,989

[45] Oct. 23, 1973

[54] TELEVISION CAMERA SCANNER SUPPORT ASSEMBLY

[75] Inventor: Davies Allport, La Jolla, Calif.

[73] Assignee: Karl F. Kuhle, San Diego, Calif.

[22] Filed: Sept. 11, 1972

[21] Appl. No.: 288,068

[52] U.S. Cl. .................. 318/266, 318/286, 318/467

[51] Int. Cl. ............................................ H01h 3/16

[58] Field of Search ............ 318/266, 267, 280–283, 318/286, 467, 468, 686; 200/153 N, 155 A

[56] References Cited

UNITED STATES PATENTS

| | | | |
|---|---|---|---|
| 3,530,268 | 9/1970 | Aubrey | 318/286 X |
| 3,488,568 | 1/1970 | Westley | 318/286 X |
| 3,248,908 | 5/1966 | Pope | 318/282 X |

*Primary Examiner*—Bernard A. Gilheany
*Assistant Examiner*—W. E. Duncanson, Jr.
*Attorney*—Keith D. Beecher et al.

[57] ABSTRACT

An improved scanner support assembly is provided for a surveillance type of television camera, and which turns the camera back and forth through an adjustable arc. The support assembly of the invention includes a housing having a rotatably mounted cover which supports the television camera. A drive motor is mounted in the housing, and it is mechanically coupled to the cover to turn the cover and the television camera supported thereby about the central axis of the housing through a predetermined arc. Limit switching means are provided which causes the motor to reverse at the ends of the arc, so that the cover and the television camera are rotated back and forth through the arc. The limit switching means is in the form of a reversing switch connected to the motor, and which is actuated by a pair of pins. A first pin depends from the cover, and it engages the reversing switch when the cover and television camera are turned in a particular direction and to a particular angular position. The other pin depends from a ring, and it actuates the reversing switch to its other position when the camera is turned in the other direction to a second angular position. The ring is attached to the cover by bolts, for example, and the angular position of the ring with respect to the cover may be adjusted.

4 Claims, 4 Drawing Figures

PATENTED OCT 23 1973 3,767,989

TELEVISION CAMERA SCANNER SUPPORT ASSEMBLY

BACKGROUND OF THE INVENTION

Surveillance television cameras are well known, and such cameras are used, for example, to permit a central surveillance station to monitor one or many remote areas. Scanners have also been provided in the past for driving the surveillance type of television camera back and forth through a selected arc, so that it may be swept through the entire area being monitored.

The purpose of the present invention is to provide an improved type of such a scanner support assembly, and one which is eminently simple and economical in its construction. Despite its simplicity, the improved scanner support assembly of the invention provides an angular drive for the television camera which reciprocates back and forth through a predetermined arc, and which includes simple means for adjusting the arc to any desired value.

DETAILED DESCRIPTION OF THE ILLUSTRATED EMBODIMENT

Figures 1, 2, 3, 4:
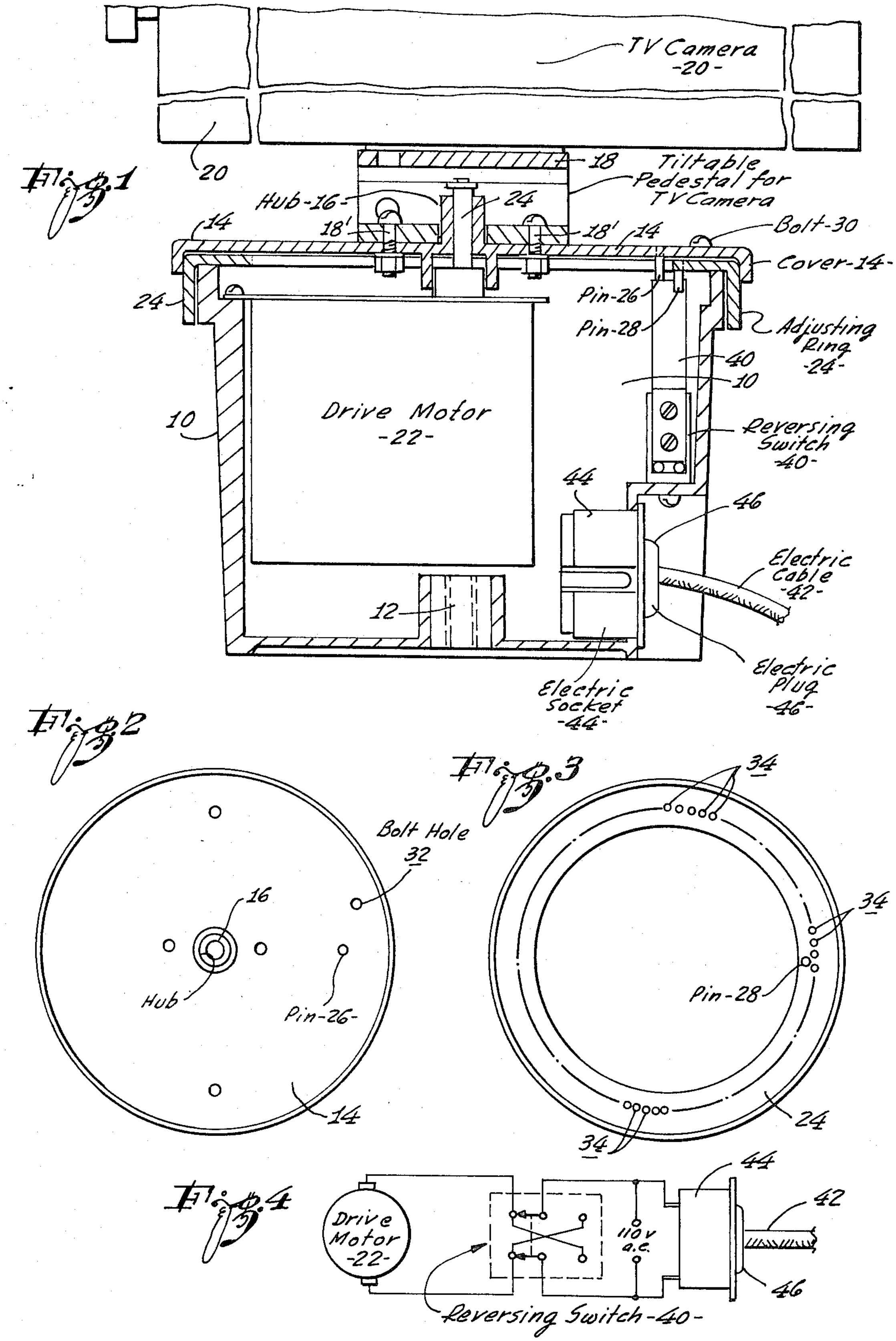
FIG. 1 is a side section of a support assembly constructed to incorporate the concepts of the invention.
FIG. 2 is a top plan view of a cover which is incorporated into the assembly of FIG. 1.
FIG. 3 is a top plan view of a ring member which is concentrically supported on the housing of FIG. 1 with respect to the cover.
FIG. 4 is a simple electrical circuit, showing the manner in which the electrical components in the housing may be interconnected.

The scanner support assembly shown in the drawing includes a housing 10 which may have a generally dish-shaped configuration. The housing 10 has an open top, and it has a bottom which is integral with the side wall, and which may include an appropriate hub or bushing 12 to permit the assembly to be mounted on an appropriate post or standard.

A cover 14 is rotatably supported on the open top of the housing 10 for rotation about the central axis of the housing. The cover 14 includes a hub 16 which is secured to the cover by means, for example, of bolts 18'. The hub 16 supports a bracket 18, which, in turn, supports the television camera 20. The bracket 18 may be tiltable, so that the television camera may be set to any desired inclination on the cover 14.

A drive motor 22 is mounted in the housing 10, and the drive shaft 24 of the motor extends through the hub 16 along the central axis of the housing, so that the motor may drive the cover 14 rotatably about the axis.

A ring 24 is rotatably mounted on the top of the housing 10 in concentric relationship with the cover 14. A first pin 26 depends from the cover 14, and a second pin 28 depends from the ring 24. The ring 24 is rotatably adjustable with respect to the cover, and is attached to the cover at any desired angular displacement, by means, for example, of a bolt 30 which extends through a hole 32 in the cover (FIG. 2) and which is threaded into a selected hole 34 in the ring 24 (FIG. 3).

A reversing switch 40 is mounted in the housing 10, and this switch is actuable to a first position by the pin 26 when the motor 22 is turning in one direction, and it is actuable to a second position by the pin 28, when the motor is rotating in the other direction. An electric cable 42 for the camera is connected to an appropriate electric socket 44, through a plug 46. As shown in FIG. 4, the socket 44, is connected to the 110-volt A.C. mains as is the reversing switch 40. The reversing switch is connected to the drive motor 22, as shown.

The connections are such that the motor turns the cover 14, and the television camera 20 supported thereby in a first direction through a particular arc until the pin 28 engages the reversing switch 40, and causes the motor to reverse. The motor now swings the camera back through the arc until the pin 26 engages the reversing switch, causing the motor again to reverse. This action is repeated, so that the television camera is continually turned back and forth through a desired arc.

The arcuate length may be adjusted, simply by removing the screw 30, turning the adjusting ring 24 to a desired angular displacement with respect to the cover 14, and inserting the screw 30, so that the ring may be attached to the cover 14 to be turned in unison with the cover. Also, as mentioned above, the bracket 18 may be tilted to any desired inclination, to control the position of the camera 20.

The invention provides, therefore, an exceedingly simple scanning assembly for supporting a surveillance television camera, or the like. The assembly is adjustable, so that the camera can be set to be scanned through any desired arc. The entire equipment is easy to install, and easy to adjust. It is fully automatic in its operation, and does not require any elaborate or intricate control circuitry.

It will be appreciated that while a particular embodiment of the invention has been shown and described, modifications may be made. It is intended in the claims to cover the modifications which come within the spirit and scope of the invention.

What is claimed is:

1. A scanner support assembly for a television camera, or the like, including: a housing having an open top; a cover member rotatably mounted on said top for rotation about the central axis of said housing; a drive motor mounted in said housing and mechanically coupled to said cover to drive said cover rotatably about said central axis; a reversing switch mounted in said housing and electrically connected to said drive motor and actuable to a first position and to a second position for controlling the direction of rotation of said drive motor; a first pin mounted to said cover in position to actuate said switch to its first position when said cover is rotated in a first direction to a first angular position; and a second pin mounted to said cover to actuate said switch to its second position when said cover is rotated in a second direction to a second angular position.

2. The scanner support assembly defined in claim 1, in which the relative angular displacement of said first and second pins is adjustable.

3. The scanner support assembly defined in claim 1, and which includes a ring rotatably mounted on said top in concentric relationship with said cover and attached thereto, said second pin being mounted on said ring.

4. The scanner support assembly defined in claim 3, and which includes bolt means for securing said ring to said cover at selected angular displacements with respect to one another.

* * * * *